United States Patent [19]

Mullican

[11] Patent Number: 4,728,017
[45] Date of Patent: Mar. 1, 1988

[54] CLAMP-ON STORAGE CONTAINER FOR PICKUP TRUCKS

[76] Inventor: Randall J. Mullican, 894 N. Judge Ely St., Abilene, Tex. 79601

[21] Appl. No.: 52,869

[22] Filed: May 22, 1987

[51] Int. Cl.$^4$ .............................................. B60R 9/00
[52] U.S. Cl. ............................. 224/42.42; 224/328; 296/24 R; 296/37.6; 312/DIG. 33
[58] Field of Search ............. 224/273, 42.42, 42.03 A, 224/42.45 R, 328; 296/24 R, 37.1, 37.6; 312/245, DIG. 33; D12/156, 157

[56] References Cited

U.S. PATENT DOCUMENTS

| | | | |
|---|---|---|---|
| D. 260,633 | 9/1981 | Gorman | D12/157 |
| D. 261,499 | 10/1981 | Sauber | D12/157 |
| 1,356,274 | 10/1920 | Edmonds et al. | 224/42.32 |
| 1,550,829 | 8/1925 | McBride | 224/42.32 |
| 1,596,795 | 8/1926 | Blakeney | 280/748 |
| 1,639,606 | 8/1927 | Hays | 224/42.32 |
| 1,711,717 | 5/1929 | Beauford | 224/42.32 |
| 3,800,990 | 4/1974 | Richardson | 224/42.42 R |
| 4,084,735 | 4/1978 | Kappas | 224/328 |
| 4,215,896 | 8/1980 | Drouin | 296/24 R |
| 4,249,684 | 2/1981 | Miller et al. | 224/42.4 |
| 4,288,011 | 9/1981 | Grossman | 224/42.42 |
| 4,531,774 | 7/1985 | Whatley | 296/37.6 |
| 4,580,827 | 4/1986 | Feagan | 296/37.6 |
| 4,623,187 | 11/1986 | Ibrahim | 296/39 R |
| 4,635,992 | 1/1987 | Hamilton et al. | 296/37.6 |

Primary Examiner—Henry J. Recla
Assistant Examiner—David Voorhees
Attorney, Agent, or Firm—Munson H. Lane, Jr.

[57] ABSTRACT

An anti-theft, portable clamp-on storage container for mounting in the load bed of a pickup truck comprises relatively movable top and bottom container sections which close to form an enclosure for goods. A screw clamp having an inverted U-shaped fixed jaw and a screw actuated movable jaw cooperable therewith is mounted with the inverted U-shaped fixed jaw supported exteriorly of the container bottom section and with the screw actuator for the movable jaw extending inside of the container. The fixed jaw is positioned to slide down over one of the side or end panels of the pickup truck load bed when the container is lowered into the floor of the load bed from above. A handle for turning the screw actuator is provided on the end of the screw actuator which is inside of the container so that the screw actuator can only be turned when the container is open. A lock is provided to lock the container closed so that the screw clamp once clamped to the side or end panel of the load bed cannot be loosened without unlocking and opening the container.

10 Claims, 12 Drawing Figures

U.S. Patent   Mar. 1, 1988   Sheet 1 of 2   4,728,017
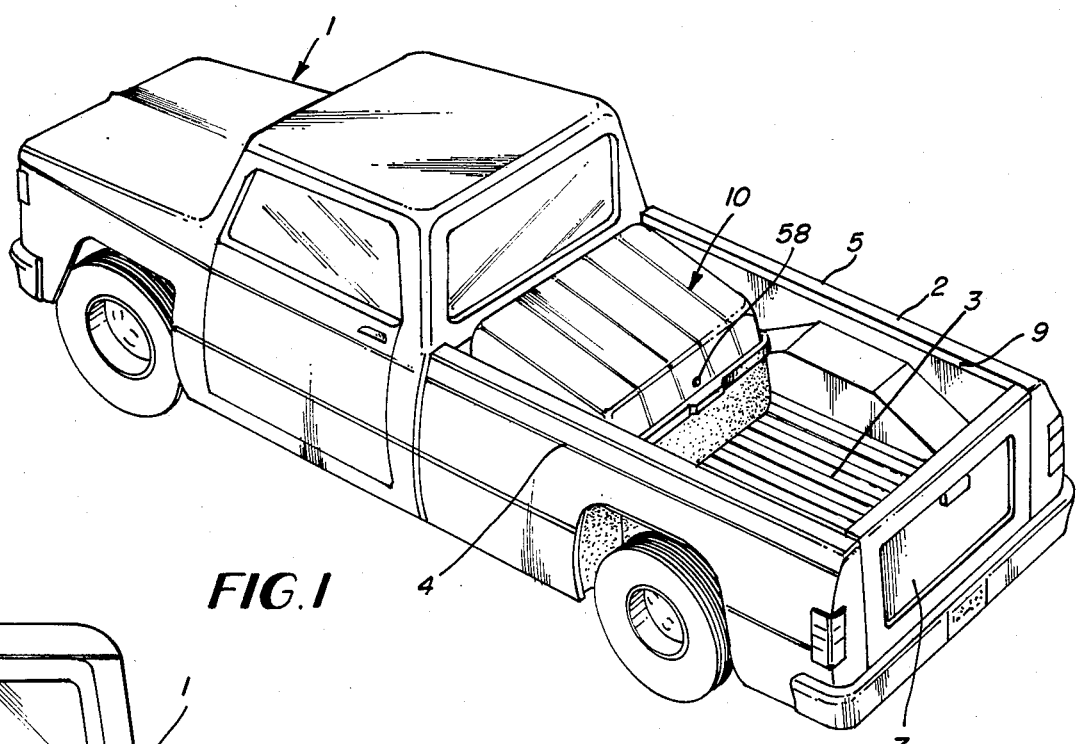
FIG. 1
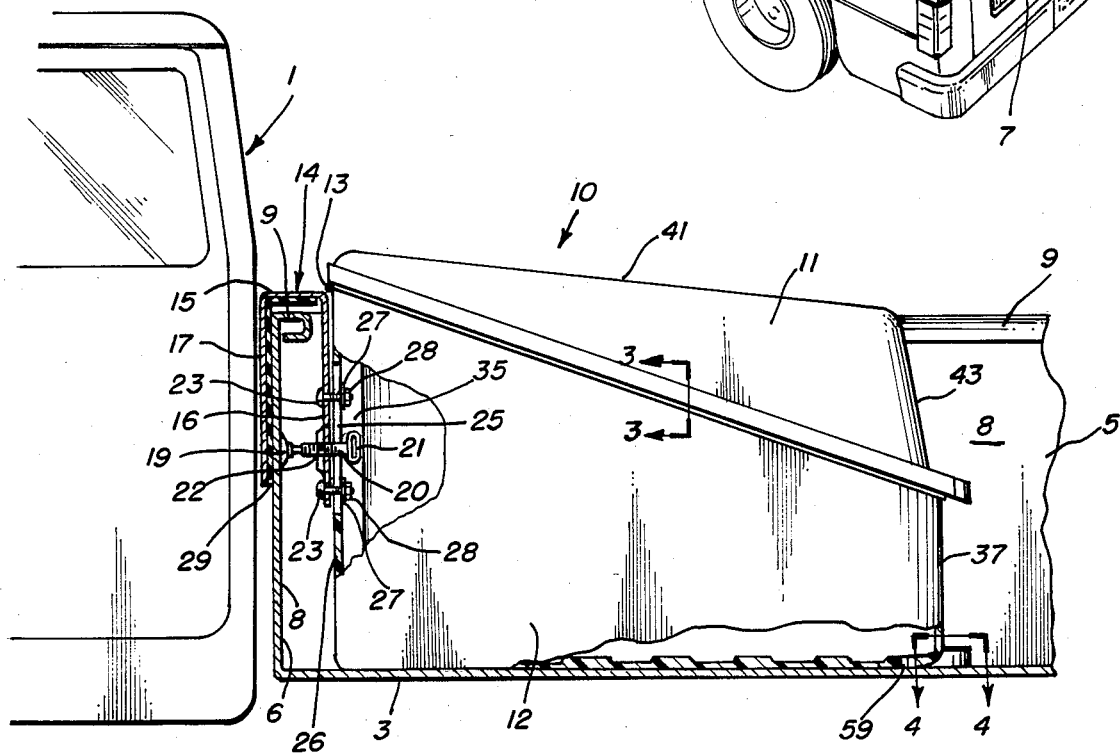
FIG. 2
FIG. 3   FIG. 12   FIG. 4
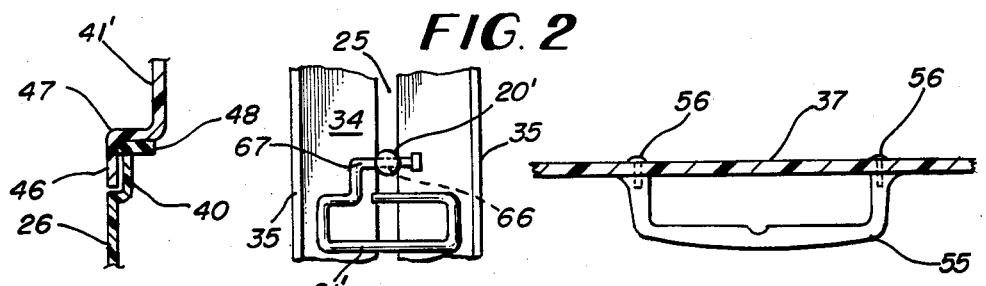

U.S. Patent    Mar. 1, 1988    Sheet 2 of 2    4,728,017
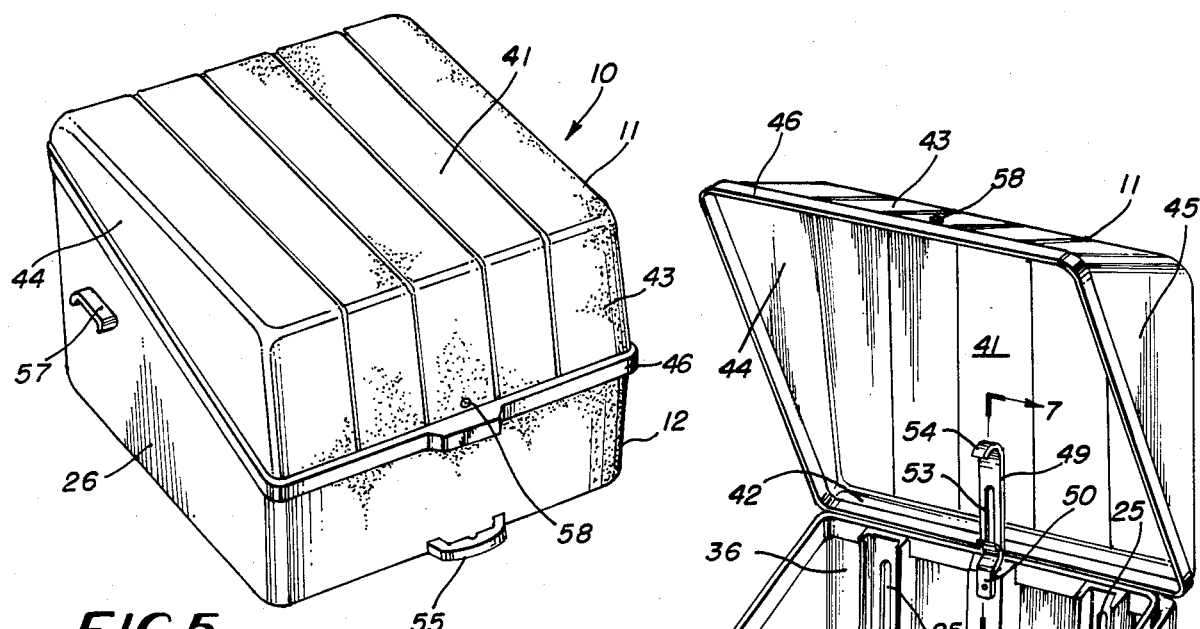
FIG.5
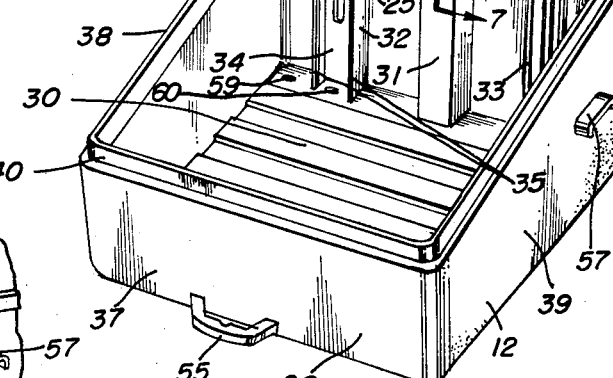
FIG.6
FIG.7
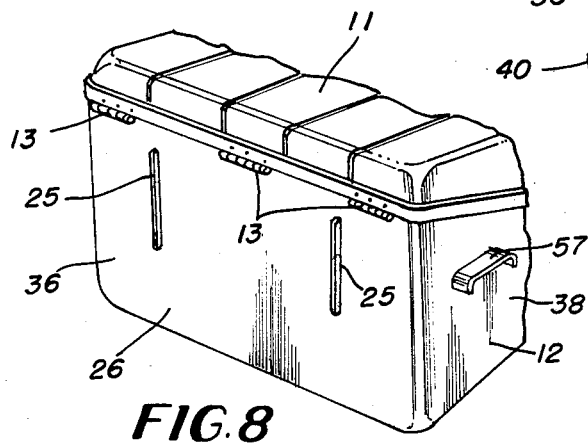
FIG.8
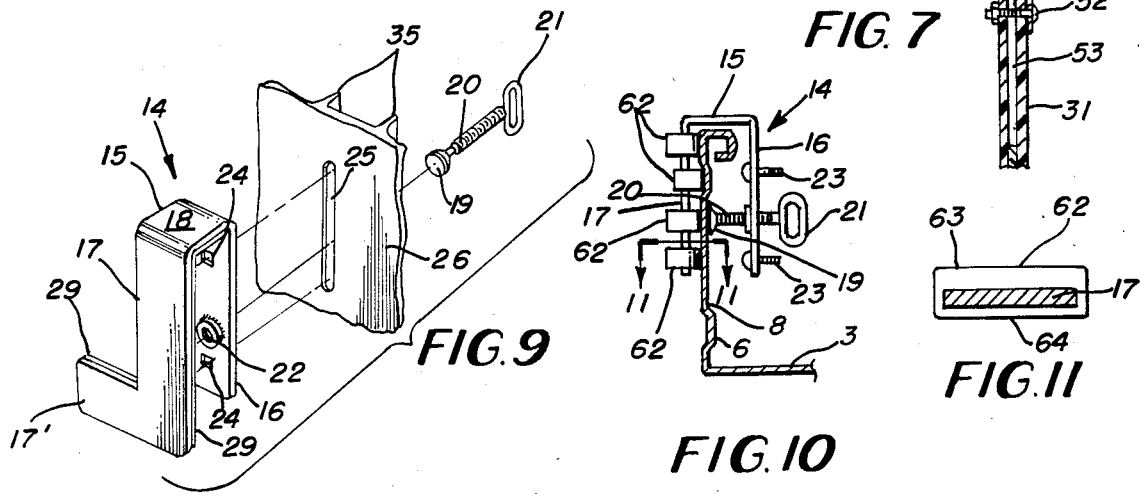
FIG.9
FIG.10
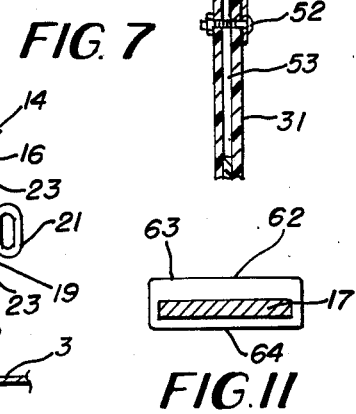
FIG.11

CLAMP-ON STORAGE CONTAINER FOR PICKUP TRUCKS

BACKGROUND OF THE INVENTION

The present invention relates to a portable, clamp-on storage container for use in the load bed of a conventional pickup truck to store and protect articles against theft and damage from the weather and the environment.

It is well known in the art to provide tool boxes which are mounted or supported in the load bed of a pickup truck. Patents representative of the prior art showing tool boxes and other storage enclosures for mounting in the load bed of a pickup truck or other vehicles are:

| | | |
|---|---|---|
| 4,249,684 | Miller et al. | Feb. 10, 1981 |
| 4,288,011 | Grossman | Sep. 8, 1981 |
| 4,531,774 | Whatley | Jul. 30, 1985 |
| 4,635,992 | Hamilton et al. | Jan. 13, 1987 |
| Des. 260,633 | Gorman | Sep. 8, 1981 |
| Des. 261,499 | Sauber | Oct. 27, 1981 |

The use of screw clamps for clamping various articles such as trunks, crates, etc., to different parts of a vehicle body is also known in the art. The following patents are representative:

| | | |
|---|---|---|
| 1,356,274 | Edmonds et al. | Oct. 19, 1920 |
| 1,550,829 | McBride | Aug. 25, 1925 |
| 1,596,795 | Blakeney | Aug. 17, 1926 |
| 1,639,606 | Hays | Aug. 16, 1927 |
| 1,711,717 | Beauford | May. 7, 1929 |
| 4,623,187 | Ibrahim | Nov. 18, 1986 |

In each of the above patents which show articles clamped onto a vehicle, the actuator for tightening the jaws of the clamp against a part of the vehicle, is accessible to anyone who might wish to remove the article from the vehicle.

It is a primary object of this invention to provide a portable, lightweight and lockable storage container which may be clamped in the load bed of a pickup truck without any structural or cosmetic changes to the load bed of the truck and without the need for tools. While storage containers of various sizes and shapes may be provided within the intent and scope of this invention as claimed, a preferred embodiment of the invention is a storage container for luggage such as suitcases, handbags, knapsacks, bedrolls, etc. which should be stored and locked in a safe enclosure to prevent theft as well as damage from the elements.

It is a further object of the invention to provide a lockable storage container having a screw clamp mounted on the container in such a manner that the clamp cannot be removed from the container when the container is locked, and the screw actuator for the clamp is accessible only from inside of the container so that when the clamp is secured to a vehicle part, such as the end wall of the load bed, and the container is locked closed, the clamp cannot be loosened or removed from the part to which it is clamped without structural damage to the container or part.

SUMMARY OF THE INVENTION

The invention is an anti-theft, portable clamp-on storage container for mounting in the load bed of a pickup truck which comprises relatively movable top and bottom container sections which close to form an enclosure for goods. A screw clamp having an inverted U-shaped fixed jaw and a screw actuated movable jaw cooperable therewith is mounted with the inverted U-shaped fixed jaw supported exteriorly of the container bottom section and with the screw actuator for the movable jaw extending inside of the container. The fixed jaw is positioned to slide down over one of the side or end panels of the pickup truck load bed when the container is lowered onto the floor of the load bed from above. A handle for turning the screw actuator is provided on the end of the screw actuator which is inside of the container so that the screw actuator can only be turned when the container is open. A lock is provided to lock the container closed so that the screw clamp once clamped to the side or end panel of the load bed cannot be loosened without unlocking and opening the container.

With the foregoing objects and features in view and such other objects and features as may become apparent as this specification proceeds, the invention will be understood from the following description taken in conjunction with the accompanying drawings wherein like characters of reference are used to designate like parts.

BRIEF DESCRIPTION OF THE DRAWINGS

FIG. 1 is a perspective view of a conventional pickup truck as seen from the left rear corner thereof with the clamp-on storage container of this invention supported on the bottom of the load bed between the opposite side walls and adjacent the front wall of the load bed;

FIG. 2 is a cross sectional view through the load bed of the truck shown in FIG. 1 showing the storage container partially broken away inorder to illustrate the manner of clamping the storage container to the front wall of the load bed;

FIG. 3 is a fragmentary sectional view taken on line 3—3 of FIG. 2;

FIG. 4 is a fragmentary sectional view taken on line 4—4 of FIG. 2;

FIG. 5 is an overall perspective view of the storage container with the top closed;

FIG. 6 is an overall perspective view of the storage container with the top open and with a slide bar pulled up to hold the top in an upright position;

FIG. 7 is a sectional view taken on line 7—7 of FIG. 6 showing the slide bar inside the containment channel;

FIG. 8 is a perspective rear view of the storage container;

FIG. 9 is an exploded perspective view of a portion of the rear wall of the storage container and of the screw clamp showing how the clamp screw passes through the slot in the rear wall and the screw hole in the clamp;

FIG. 10 is a fragmentary sectional view through the front end panel of the load bed of a pickup truck showing a screw clamp in side elevation mounted over the end panel with rubber sleeves fitted on the fixed jaw of the clamp;

FIG. 11 is a sectional view taken on line 11—11 of FIG. 10;

FIG. 12 is a partial front elevational view of an interior portion of the rear wall of the storage container bottom section showing a modification of the clamp screw handle.

DETAILED DESCRIPTION OF THE PREFERRED EMBODIMENT OF THE INVENTION

Referring to FIG. 1 a portable clamp-on storage container of this invention, indicated generally by the reference numeral 10, is shown mounted in the load bed 2 of a conventional pickup truck 1. The load bed 2 conventionally has a rectangular floor 3, a pair of upstanding side panels 4 and 5 extending longitudinally along opposite sides of the floor, an upstanding front panel 6 and a tailgate 7 at opposite ends of the load bed. Each of the side panels 4 and 5 and front panel 6 have an upstanding main wall portion 8 of sheet metal and an inwardly projecting upper edge portion 9 at the top of the main wall portion 8.

The storage container 10 comprises mating top and bottom sections 11 and 12 which close to form an enclosure for articles to be stored therein. Hinges 13 connect the top and bottom sections 11 and 12 for relative swinging movement thereof between a closed position, as shown in FIG. 1, and an open position as seen in FIG. 6. Clamping means indicated generally at 14 is secured to the bottom section 12 for clamping the container 10 to one of the upstanding panels of the load bed (see FIG. 2).

The clamping means includes at least one, and preferably two clamps 14 each comprised of a generally inverted U-shaped bracket, or fixed jaw element 15 having a pair of spaced upright portions 16 and 17 connected by a bend portion 18 and a cooperating movable jaw 19 mounted on one end of a threaded stem 20 which extends through an internally threaded boss or opening 22 in the upright portion 16. The stem 20 has an enlarged handle 21 on its end opposite to the jaw 19. The fixed jaw element 15 is secured externally of the upright perimeter wall 26 of the bottom section 12 by means of bolts 23 extending through spaced openings 24 in the upright portion 16 and through one of the two elongated slots 25 in the upright perimeter wall of the container bottom section. Each of the bolts 23 preferably has a head with a square shank portion adjacent the head which fits into and fills one of the square openings 24 to prevent turning of the bolt in the opening. Threaded ends of the bolt shanks project inside of the bottom container section 12 through slot 25 where they are secured by placing nuts 28 on the projecting bolt ends and turning the nuts to draw the fixed jaw element 15 tightly against the upright perimeter wall 26 of the bottom section 12. Washers 27 of sufficient diameter to overlap the side margins of the slot 25 are positioned under the nuts to provide a bearing surface for the nuts against the inside surface of the perimeter wall 26.

In assembling the clamping means 14 with the bottom section 12, the fixed jaw element 16 of each clamp 14, if more than one, is positioned upright as shown in FIG. 9 and the handle 21 is turned to a vertical position where it is in alignment with the longitudinal axis of one of the slots 25. The handle 21 and threaded stem 20 are then pushed freely through the slot 25 by pressing the fixed jaw element 15 against the upstanding perimeter wall 26. Bolts 23 are then inserted through the openings 24 in jaw portion 16 until the square portion of the shank of each bolt is seated in one of the square openings 24 and the threaded shank portion of each bolt projects through the slot 25. Washers 27 and nuts 28 are then applied to the projecting ends of the bolts 23 inside of the container bottom section and the nuts tightened to draw the fixed jaw element 15 tight against the upright perimeter wall 26.

Although only one clamp 14 is seen in FIGS. 2 and 9, it will be understood that there are actually two clamps 14, one for each of the two slots in the upstanding perimeter wall 26 shown in FIG. 8.

FIG. 9, which is an exploded view, for clarity shows the movable jaw 19 and its screw actuator 20 on the side of the perimeter wall 26 opposite to the fixed jaw element 15. It is obvious that the movable jaw 19 must be positioned between the fixed jaw elements 16 and 17, and that the end of the stem 20 opposite handle 21 must be threaded through threaded opening 22 and connected to the movable jaw 19, preferably by a swivel joint, before the clamp 14 is assembled with the storage container bottom section 12.

The storage container 10 is preferably secured to the upright front end panel 6 of the pickup truck load bed 2 as shown in FIGS. 1 and 2, however, it may be secured to either of the side panels 4 and 5 and even to the tailgate 7, if desired.

To secure the storage container 10 to one of the upright panels 4, 5 and 6, the nuts 28 on bolts 23 fastening each clamp 14 to the upstanding perimeter wall 26 of the container bottom section 12 are loosened to permit vertical adjustment of the clamp 14 by allowing the bolts 23 to slide up or down within the confines of a slot 25. The screw 20, attached to the movable jaw 19, is backed out to its maximum extent by turning the handle 21 until the swivelled movable jaw 19 abuts against the threaded boss 22. The container 10 with attached clamps 14 are lifted into the truck bed 2 where they are positioned with the opening between the upright portions 16 and 17 of the fixed jaw element over the upper edge portion of the upstanding panel 6. The container and clamps 14 are lowered until the bottom section of the container rests on the floor 3 of the load bed. Each clamp 14 is then slid up or down, as needed, until the bend portion 18 rests firmly on top of the edge portion 9 of the upright panel 6. Preferably a resilient pad or cushion 29 is provided under the bend portion 18 and on the inside surface of the upright jaw portion 17 of each clamp inorder to prevent scratching or marring of the finished surfaces of the upstanding load bed panel to which the clamp is applied. Once the clamps 14 have been properly adjusted to rest firmly on the top edge of the upstanding panel 6, the nuts 28 are tightened to secure the fixed jaw in adjusted position. The clamp screws 20 are then screwed in to seat the movable jaw 19 against the inside surface of the upstanding wall postion 8 of the end panel 6. Continued turning of the clamp screws 20 will firmly clamp the upstanding wall portion 8 between the movable jaw 19 and fixed jaw portion 17.

An important feature of this invention is that once the container 10 has been secured in place in the load bed 2 by means of the clamps 14, and the container top and bottom sections have been locked in closed position as shown in FIG. 2, it is impossible to remove the container from the load bed without doing structural damage to the container, load bed or both. With the container 10 locked closed, the clamps 14 can't be removed because the handles for actuating the clamp screws 20 are inside the locked container. Also the bolts 23 can't be removed from outside the container because the nuts 28 are inside of the container and the bolts 23 are prevented from turning by the square shank portions of the bolts fitting in the square holes 24 of the fixed jaw portion 16. If an attempt is made to lift the container out of the load bed without loosening the clamps 14, the clamps, even if they are forced to slide relative to the wall postion 8, will be stopped from further upward movement by the inwardly projecting edge portion 9.

It is within the scope of this invention that the storage container 10 may be of various sizes and shapes for carrying different articles which need to be protected from theft and the weather as well as from damage from being loosely stored in the load bed itself. The storage container shown in the drawings is one designed primarily for carrying luggage, such as suitcases, handbags, knapsacks, bedrolls and the like. Other types of storage containers envisioned include, by way of illustration and not by way of limitation, long, narrow containers for fishing rods, guns or the like; ice coolers; toolboxes, etc. The container should be made from strong durable materials that are not easily broken into because one of the important uses for the container is to prevent theft of articles carried therein.

The container 10 intended for carrying luggage is preferably made from high density polypropylene or high density polyethylene by a thermoforming process. The top and bottom sections 11 and 12 will have reinforcing ribs where needed. The bottom 30 of the bottom section 11 includes multiple spaced transverse ribs for added strength. The rear portion of the upright perimeter wall 26 is reinforced with a central vertical tube 31 and a pair of vertical channels 32 and 33 located on opposite sides of the center tube. The vertical slots 25 previously described, are formed medially in the base 34 of channels 32 and 33 between the inwardly projecting channel legs 35,35. The perimeter wall 26 of the bottom section includes a rear wall portion 36, a front wall portion 37 and opposite side wall portions 38 and 39. A narrow inwardly offset, vertical perimeter lip 40 extends entirely around the perimeter wall 26. The rear wall portion 36 is shown in FIG. 2 as being slightly higher than the height of the load bed front panel 6, the front wall portion 37 is of substantially lesser height than the rear wall portion, and the height of the side wall portions 38 and 39 varies uniformly from a height equal to the height of the rear wall portion to a height equal to the height of the front wall portion.

The top section 11 comprises a top panel 41 and a depending perimeter wall 41' including a low rear wall portion 42, a high front wall portion 43 and side wall portions 44 and 45 varying in height from a minimum adjacent to the rear wall portion 42 to a maximum adjacent to the front wall portion 43. A narrow outwardly offset vertical lip 46 extends entirely around the depending perimeter wall of the top section 11, and is connected to the depending perimeter wall 41' by an outwardly extending ledge or shoulder 47 (see FIG. 3). A gasket seal 38 is secured to the underside of the ledge 47 inorder to provide a water tight and dust proof seal for engagement with the inwardly offset lip 40 of the bottom container section 12 when the top and bottom container sections are closed. The inwardly offset perimeter lip 40 of the bottom section fits closely inside of the outwardly offset perimeter lip 46 of the top section when the top section 11 is closed upon the bottom section 12 (see FIG. 3).

In order to hold the top section 11 in a raised position as shown in FIG. 6, a prop 49 (shown in detail in FIG. 7) is provided which slides up and down in the center tube 31 in rear wall portion 36 of the bottom section's perimeter wall 26. A resilient clip 50 having a bent end 51 which bears against the prop 49 is secured outside of the tube 31 by a fastener 52 which extends transversely through the tube 31. A vertical slot 53 extending medially of the prop 49 cooperates with the fastener 52 to limit vertical adjustment of the prop 49 within the tube 31. In the lowered position of the prop 49, the hooked end 54 of the prop fits closely over the top of clip 50. In the raised position of the prop, the prop extends parallel with the inside surface of the top panel 41 and thereby holds the top section 11 in raised position. The clip 50 bearing against the prop 49 frictionally holds the prop in raised position.

Although one specific form of prop for holding the top section 11 open has been shown and described, other types of props for the same purpose may be used. There are many commercially available props for holding open a hinged container lid and anyone of them may be substituted for the prop 49.

A handle 55 is provided on the front wall portion 37 of the bottom section 12 by which the container 10 may be carried when the container is detached from the load bed of pickup truck 1. The handle 55 may be separably connected to the front wall portion 37 by screw fasteners 56 or it may be integrally formed or molded with the bottom section 12.

Side handles 57 are provided on opposite sides of the bottom section 12 by which the container 10 may be lifted vertically from the position shown in FIG. 5.

A lock 58 is provided in the front wall portion 43 of the top section 11 for locking the top and bottom sections 11 and 12 in closed position. The lock 58 may be any of many conventional trunk or suitcase locks or it may be one of special design. It is within the scope of this invention that the lock may include a hasp secured to top and bottom sections which is locked by a padlock.

Various other features may be included in the container 10. In some situations, such as in off highway use over rough roads, it may be desirable to fasten the bottom of the container 10 to the floor 3 of the load bed to prevent the container from bouncing. For this purpose, holes 59 (see FIGS. 2 and 6) may be provided in the four corners of the floor 30 through which fasteners such as screws and bolts may be passed to secure the bottom 30 to the floor 3. Normally the use of fasteners to secure the container 10 to the floor of a load bed would not be desired because of the necessity to drill holes in the load bed.

Also drain holes 60 (only one shown in FIG. 6) may be provided in the floor 30 at the bottom of each of channels 32 and 33 for draining water from the container which might seep in through slots 25 in the base of the channels. Leakage of water and dust through the slots 25 will normally be prevented by providing gaskets between the upright portion 16 of the clamp 14 and the upright wall portion 26 of the bottom section 12 covering the slots 25.

Referring back to FIG. 9, the upright portion 17 of the fixed clamp element 15 is shown as having a right angle lateral extension 17'. The lateral extension 17' is of such length that it will bridge over vertical corrugations or depressions that may be provided in the front end panel of some pickup trucks and thereby will enable the jaw portion 17 to make contact with the end wall panel in areas within the same plane.

Also for the purpose of maintaining the jaw portion 17 in a substantially vertical position even thought the end panel to which it is clamped may not be planar, sleeves 62 of rubber or of other resilient material may be slipped over the upright portion 17 as shown in FIG. 10. The sleeves 62 (see FIG. 11) are thicker on one side 63 than on the other side 64. By placing one or more of the sleeves 62 on the jaw portion 17 with the thick side 63 adjacent the end panel 6 and positioning the sleeve or sleeves so that the thick side 63 fills a depression in the end panel 6, the jaw portion 17 can be caused to have contact with the end panel 6 through the sleeves 62 for the greater part of its length while maintaining a vertical orientation. Sleeves 62 having different thicknesses on each of the two sides 63 and 64 may be provided to fill depressions of different depths.

Another feature not previously mentioned is the sloping top 41 of the container 10. As seen in FIG. 2, the top 41 slopes from a high adjacent to the rear perimeter wall portion 36 to a low adjacent to the front perimeter wall portion 37 of bottom section 12. The sloping top of the container 10 enables a person looking out of the rear window of the pickup truck 1 to see the portion of the load bed to the rear of the container 10.

FIG. 12 shows a modified clamp screw 20' which extends through the slot 25 in the base 34 of one of the channels 32 or 33 in the rear wall portion of the bottom section 12 of the storage container 10. The clamp screw 20' has a handle 21' of generally rectangular configuration which is pivotally mounted in a transverse bore 66 through the screw shank 20' by means of an offset pivot pin portion 67 loosely fitted in the bore 66. The handle 21' will normally pivot downwardly under its own weight beneath the screw shank 20' to the position shown in FIG. 12. When the handle is so positioned, any turning motion of the shank 20' in either direction by a force applied externally of the container will be limited by the handle abutting against one of the legs 35,35 of a channel member 32 or 33 in which the screw is located. Thus, any attempt by a person desirous of removing a locked container 10 from the load bed of a pickup truck by using pliers or other turning tool to grasp the shank 20' of the clamp screw from outside of the container 10 would be defeated because the screw clamp could not be loosened sufficiently to remove the container and clamp from the wall to which the container is clamped. A container and screw clamp having the modified handle of FIG. 12 would have an even greater protection from theft than the container and screw clamp previously described. Other means for blocking the turning movement of a clamp screw for the purpose of loosening the clamp are within the scope of this invention.

It will be understood that the elongated, generally planar main handle portion 21' will swing freely over the inner end of the stem 20' from positions on either side of said stem in which the plane of said main handle portion is substantially perpendicular to the axis of said stem 20' to a position where the axis of said stem lies in the plane of said planar main handle portion. The major length of the handle portiom 21' should span a major portion of the distance between the channel legs 35,35 to limit undesired turning of the screw stem 20', from outside of the container 10.

When it is desired to loosen the screw clamp 14 by turning the handle 21' after the container has been opened, the main handle portion 21' will be swung upwardly from the position shown in FIG. 12 until a projection of the axis of the stem 20' lies in the plane of the main handle portion. The main handle portion can then be turned to rotate the screw stem in either direction for loosening or for tightening the screw. It will be obvious that the offset of the main handle portion must be sufficient to permit the main handle portion when raised from a position shown in FIG. 12 to a position where the handle extends perpendicularly to the base portion 34 to turn freely without contact with the channel legs 35.

While in the foregoing there has been described and shown a preferred embodiment of the invention, various modifications and equivalents may be resorted to within the spirit and scope of the invention as claimed.

What is claimed is:

1. A portable clamp-on storage container for mounting in the load bed of a conventional pickup truck without any structural or cosmetic alterations of the load bed and without the use of tools, the load bed conventionally having an elongated rectangular floor, a pair of upstanding side panels extending longitudinally along opposite sides of said floor, an upstanding front panel and a tailgate panel extending between said side panels at opposite ends of the load bed, said upstanding front and side panels each having an upstanding main wall portion and an inwardly projecting upper edge portion at the top of said upstanding wall portion, said storage container comprising mating top and bottom sections which form an enclosure for articles to be stored therein, said bottom section having a bottom and an upstanding perimeter wall, an opening in said perimeter wall, means connecting said top and bottom sections for relative movement thereof between an open and a closed position, lock means for locking said top and bottom sections in said closed position, and at least one clamping means secured to said bottom section for clamping said container to one of the upstanding panels of said load bed, said clamping means having fixed jaw means having a first portion and a bend portion extending upwardly and outwardly respectively from said bottom section for engaging over the inwardly projecting upper edge of said one of the upstanding panels and a depending jaw portion extending downwardly along an outside surface of the main upstanding wall portion of said one upstanding panel, and a cooperating movable jaw mounted on a threaded stem which extends inside of said container through said opening in said perimeter wall of said bottom section, said threaded stem having a handle at one end inside of said container for turning said stem, said stem being threadedly mounted in said first portion of said fixed jaw means for reciprocally moving said movable jaw relative to said depending jaw portion.

2. The portable clamp-on storage container of claim 1 wherein said means connecting said top and bottom sections comprises hinge means connecting said top and bottom sections for swinging movement relative to each other.

3. The portable clamp-on storage container of claim 2 together with an adjustable prop for holding said top container section in an open position relative to said bottom section.

4. The portable clamp-on storage container of claim 2 wherein said top and bottom sections each have perimeter lips one of which fits within the other when the container is closed, and resilient seal means for sealing said top and bottom sections in said closed position.

5. The portable clamp-on storage container of claim 1 wherein said first portion of said fixed jaw is secured to the upstanding perimeter wall of said bottom section by fastening means which extend through said first portion of said fixed jaw and through said perimeter wall of said bottom section, with detachable means for securing said fastening means against removal from said perimeter wall positioned inside of said bottom section.

6. The portable clamp-on storage container of claim 1 wherein said upstanding perimeter wall of said bottom section includes a rear wall portion, a front wall portion and side wall portions interconnecting said front and rear wall portions, said opening in said perimeter wall being located in said rear wall portion and said fixed jaw means being securing to said rear wall portion.

7. The portable clamp-on storage container of claim 6 wherein said rear wall portion is clamped to the upstanding front wall panel of said pickup truck load bed.

8. The portable clamp-on storage container of claim 7 wherein said rear wall portion of said bottom container section is higher than the upstanding front wall panel of said pickup truck load bed, and said top section is connected to said bottom section by hinge means which has a horizontal pivot axis located adjacent to the top edge of said rear wall portion.

9. The portable clamp-on storage container of claim 6 wherein said opening in said rear wall portion is a vertically elongated slot, said fixed jaw means being vertically adjustably mounted on said rear wall portion by fastener means extending through said first portion of said fixed jaw means and through said vertically elongated slot, with detachable means positioned inside of said bottom section for securing said fastening means against removal from said rear wall portion, said slot being of such length as to permit vertical adjustment of said fastening means in said slot.

10. The portable clamp-on storage container of claim 9 wherein said rear wall portion is reinforced by at least one vertical channel member including a base which is a part of said rear wall portion and a pair of horizontally spaced vertical legs projecting perpendicularly inwardly from said base, said elongated slot being located in said base medially of said legs, said screw stem having a transverse bore adjacent said one end inside of said container and said handle having a pivot pin portion freely mounted in said transverse bore for rotation therein, and an elongated generally planar main handle portion offset from said pivot pin portion and substantially parallel therewith, said main handle portion being offset sufficiently from said pivot pin portion to swing freely over said one end of said stem from positions generally parallel to said channel base on either side of said stem, said main handle portion having a length which is less than the distance between said channel legs and which is sufficiently long so that when the main handle portion is positioned parallel to said channel base between said channel legs, turning motion of said screw stem by a force applied from outside of said container will be blocked by the engagement of said main handle portion with one of the channel legs.

* * * * *